Dec. 5, 1961  J. J. PACHECO  3,011,235
CLAMP FOR ATTACHING CULTIVATOR TOOLS TO TOOL CARRYING BARS
Filed Dec. 3, 1959
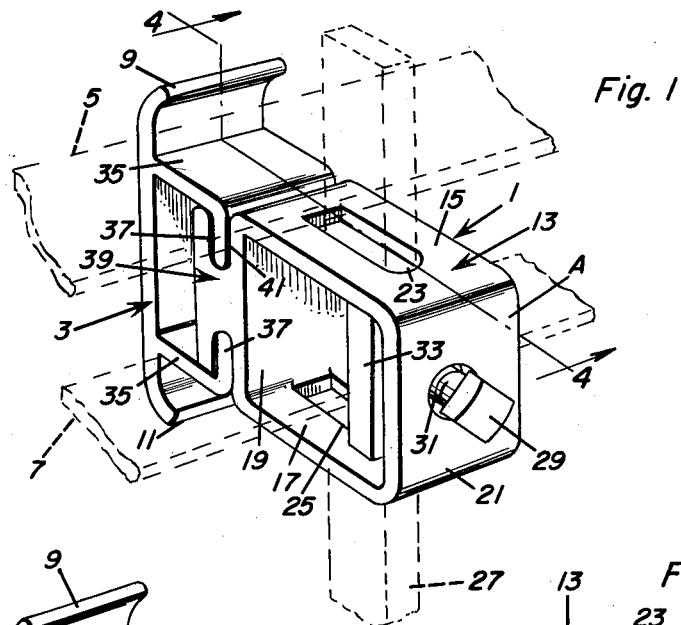
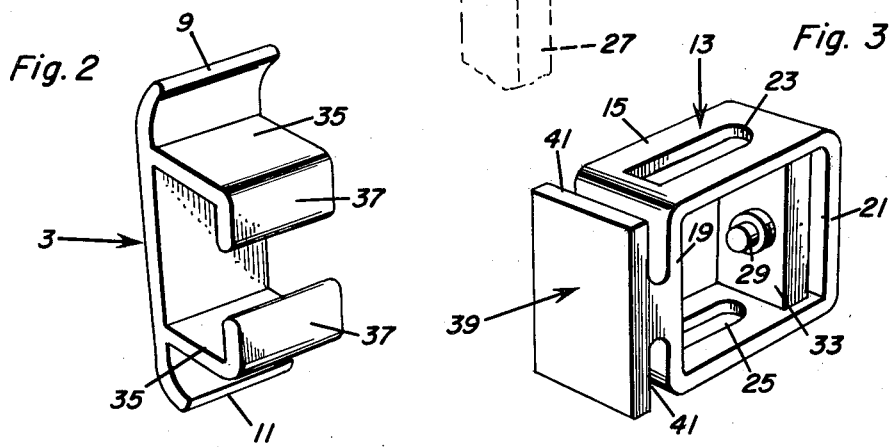
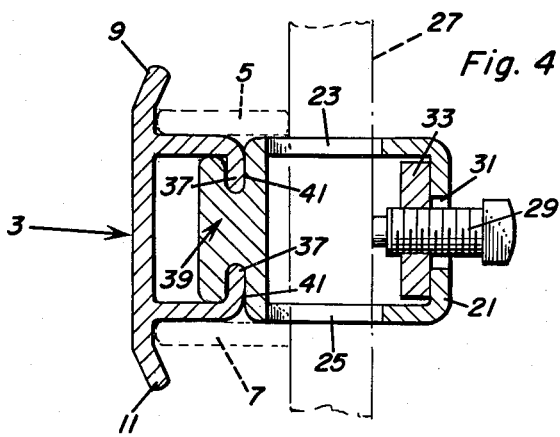
Joseph J. Pacheco
INVENTOR.

United States Patent Office 3,011,235
Patented Dec. 5, 1961

3,011,235
CLAMP FOR ATTACHING CULTIVATOR TOOLS TO TOOL CARRYING BARS
Joseph J. Pacheco, P.O. Box 124, Greenfield, Calif.
Filed Dec. 3, 1959, Ser. No. 857,088
5 Claims. (Cl. 24—81)

This invention relates to improvements in clamps for attaching the shanks of cultivator shovels or other ground working tools to a tractor having spaced apart upper and lower parallel tool carrying bars.

The primary object of the invention is to provide a time and labor saving clamp for easily and quickly attaching to such tool carrying bars, or detaching the same therefrom, the especially long shanks of cultivator shovels and the like used in cultivating high crops such as onions, beets, tomatoes and other high growing plants.

Another object is to provide a clamp for the above purpose which is strong, practical, readily adaptable for clamping shanks of different sizes to such tool carrying bars and which may be manufactured, at a reasonable cost.

Another object is to provide a clamp according to the foregoing which is readily slidable along such tool bars for locating the cultivator shanks in different positions on such bars, and which involves a removable shank holding member adapted for sliding downwardly onto said shanks and to obviate lifting the tool carrying bars on the tractor or jacking up the wheels of the tractor in order to place a shank in the clamp, which are expedients commonly resorted to by farmers in clamping such shanks to tractor tool carrying bars by present-day clamps.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, partly in broken lines, of a clamp constructed in accordance with this invention clamping a cultivator shank to the tractor tool carrying bars;

FIGURE 2 is a perspective view of a jaw member forming part of the clamp;

FIGURE 3 is a perspective view of a shank holding member forming part of the clamp, and FIGURE 4 is a view in vertical longitudinal section taken on the line 4—4 of FIGURE 1.

Referring to the drawing by numerals, the clamp, designated generally by the numeral 1, comprises a vertically elongated, preferably rectangular, jaw member 3 for clamping engagement with corresponding front sides of upper and lower spaced apart tool carrying bars 5, 7, such as are provided on certain types of tractors. Preferably the jaw member 3 is formed of flat bar metal with upper and lower rearwardly curved ends 9, 11 in which said bars 5, 7 are adapted to fit.

A shank holding member 13 is provided and separably coupled, by means presently described, to the jaw member 3 to extend rearwardly thereof and interlock therewith. The shank holding member 13 is of elongated rectangular, hollow form with top, bottom and front and rear walls 15, 17, 19, 21, respectively, and is open at its sides and when coupled to the jaw member 3 slidably fits part-way between the tool carrying bars 5, 7. A pair of upper and lower aligned longitudinally extending slots 23, 25 are provided in the upper and lower walls 15, 17, respectively, so that said shank holding member 13 may be slidably slipped downwardly over an upright cultivator shank 27, as shown in broken lines in FIGURES 1 and 4. It will be noted that the slots 23, 25 permit forward sliding of the shank 27 laterally toward and against the rear sides of the tool carrying bars 5, 7.

Screw thread means is provided in the shank holding member 13 for moving the shank 27 forwardly against the rear sides of the tool carrying bars 5, 7 comprising a screw bolt or setscrew 29 extended into said member 13 longitudinally thereof through a relatively larger diameter opening 31 in the rear wall 21 of said member 13 for longitudinal movement of said screw bolt 29 while disconnected from said member 13.

A rectangular reaction plate 33 through which the bolt 29 is threaded is slidably fitted in said member 13 in upright position for rearward sliding against the rear wall 21 in response to turning of the bolt 29 in the proper direction and whereby to cause the screw bolt 29 to feed forwardly against the shank 27 to move the shank 27 laterally into engagement with the rear sides of the tool carrying bars 5, 7. As will be seen, screw feed movement of the bolt 29 through the reaction plate 33 moves said plate rearwardly against the rear end 21 of the shank holding member 13.

The before mentioned coupling means comprises a pair of lateral rearwardly extending flat, upper and lower hooks or flanges 35 on the jaw member 3 at right angles thereto and spaced apart to slidably fit between the tool carrying bars 5, 7, part-way, so that the jaw member 3, like the shank holding member 13 is slidable along said bars 5, 7 as will presently be clearly seen. The flanges 35 terminate in a pair of right angled tongues 37 turned toward each other in confronting relation. The flanges 35 straddle a T-head 39 on the front wall 19 of the shank holding member 13 and which forms with said wall 19 a pair of upright upper and lower grooves 41 in which the tongues 37 slidably fit for separation of the jaw and shank holding members 3, 13 from each other and for coupling said members 3, 13 together by sliding of said flanges 37 edgewise into and out of said grooves 41.

As will now be seen, screw feed of the bolt 29 can move the shank 27 laterally against one side of the tool carrying bars 5, 7 and will cause the shank holding member 13 to move rearwardly relative to the shank 27 to pull the jaw member 3, into clamping engagement with one side of the bars 5, 7, and at the same time move the shank 27 into clamping engagement with the other sides of said bars 5, 7, said bars 5, 7 and holding member 13 coacting to hold the shank in upright position. By loosening the bolt 29, the jaw member 3 and the shank holding member 13 may, together with the shank 27 and a shovel on said shank, not shown, be moved as a unit into selected positions on the tool carrying bars 5, 7 with the shank 27 slid upwardly in said holding member 13 so that the shovel will clear the ground. Then, in the selected position, the shank 27 may be clamped to said bars 5, 7 in the manner already described. Also, by loosening the bolt 29, the coupling means 39 may be loosened so that the shank holding member 13 may be separated from the jaw member 3 and removed for placing downwardly separately over a shank to be clamped to the tool carrying bars 5, 7 easily and quickly when the shank holding member 13 is coupled to the jaw member 3 in the manner already described and the bolt 31 actuated to effect clamping of the jaw member 3 and the shank 27 to said bars 5, 7.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A clamp for securing an agricultural tool shank to a tool carrier of the type including a pair of opposed vertically spaced horizontal bars, said clamp comprising a holder including an end portion insertable between the bars and having upwardly and downwardly opening transverse grooves therein, said holder further having vertically aligned longitudinal slots therein for receiving a tool shank for sliding adjustment in vertical and horizontal planes, a jaw member engageable with the bars on one edge thereof, opposed hooks on said jaw member insertable between the bars and slidably engageable in the grooves for detachably connecting said jaw member to the holder, and common means on the holder for engaging the shank with the other edges of the bars for clamping said bars between the jaw member and the shank and for frictionally securing said shank in adjusted position.

2. A clamp in accordance with claim 1, wherein said means includes a setscrew threadedly mounted on the holder and engageable with the shank.

3. A clamp in accordance with claim 1, wherein said means includes a reaction plate slidably mounted in the holder and engageable with a wall thereof, and a setscrew threadedly mounted in the plate and engageable with the shank, said wall having an opening therein, said setscrew extending through the opening to the exterior of the holder.

4. A clamp assembly for securing an agricultural tool shank on a tool carrier of the type including a pair of opposed, vertically spaced bars, said clamp comprising a holder including a T-head insertable between the bars, a jaw member engageable with one edge of the bars and comprising a pair of opposed hooks insertable therebetween and engageable behind the T-head for detachably connecting said jaw member to the holder, and common means for securing a tool shank on the holder and for clamping the assembly on the bars.

5. A clamp assembly for securing an agricultural tool shank on a tool carrier of the type including a pair of opposed, vertically spaced bars, said clamp comprising a holder including a T-head insertable between the bars, a jaw member engageable with one edge of the bars and comprising a pair of opposed hooks insertable therebetween and engageable behind the T-head for detachably connecting said jaw member to the holder, and common means for securing a tool shank on the holder and for clamping the assembly on the bars, said holder having vertically aligned, longitudinal slots therein receiving the shank for sliding adjustment in vertical and horizontal planes, said means including a setscrew threadedly mounted in the holder for engaging the shank with the other edges of the bars and reacting on the holder for clamping said bars between the jaw member and the shank.

References Cited in the file of this patent
UNITED STATES PATENTS

| | | |
|---|---|---|
| 759,560 | Sharp | May 10, 1904 |
| 877,723 | Kollander | Jan. 28, 1908 |
| 1,941,258 | Gordon | Dec. 26, 1933 |
| 2,044,700 | Jones | June 16, 1936 |
| 2,187,642 | Brown | Jan. 16, 1940 |
| 2,540,426 | Campbell | Feb. 6, 1951 |
| 2,679,872 | Sutcliffe | June 1, 1954 |
| 2,743,657 | Kriegbaum | May 1, 1956 |